United States Patent
Van Dijk

(10) Patent No.: US 12,434,536 B2
(45) Date of Patent: Oct. 7, 2025

(54) THERMAL CONDITIONING SYSTEM FOR A VEHICLE

(71) Applicant: Atlas Technologies Holding B.V., Helmond (NL)

(72) Inventor: Matijn Maria Henrikus Van Dijk, Nederweert (NL)

(73) Assignee: Lightyear IPCo B.V., Helmond (NL)

( * ) Notice: Subject to any disclaimer, the term of this patent is extended or adjusted under 35 U.S.C. 154(b) by 209 days.

(21) Appl. No.: 18/010,489

(22) PCT Filed: Jun. 28, 2021

(86) PCT No.: PCT/EP2021/067727
§ 371 (c)(1),
(2) Date: Dec. 15, 2022

(87) PCT Pub. No.: WO2022/002864
PCT Pub. Date: Jan. 6, 2022

(65) Prior Publication Data
US 2023/0226884 A1   Jul. 20, 2023

(30) Foreign Application Priority Data
Jul. 2, 2020  (NL) .................................... 2025974

(51) Int. Cl.
*B60H 1/00* (2006.01)
*B60H 1/24* (2006.01)
*B60H 1/26* (2006.01)

(52) U.S. Cl.
CPC ..... *B60H 1/00828* (2013.01); *B60H 1/00278* (2013.01); *B60H 1/00778* (2013.01);
(Continued)

(58) Field of Classification Search
CPC ............ B60H 1/00828; B60H 1/00278; B60H 1/00778; B60H 1/248; B60H 1/265;
(Continued)

(56) References Cited

U.S. PATENT DOCUMENTS

| | | | | |
|---|---|---|---|---|
| 4,858,676 A | * | 8/1989 | Bolfik ................ | G05D 23/1917 62/133 |
| 4,858,677 A | * | 8/1989 | Doi ..................... | B60H 1/00828 236/46 F |

(Continued)

FOREIGN PATENT DOCUMENTS

| CN | 104648078 A | 5/2015 |
|---|---|---|
| CN | 106061772 A | 10/2016 |

(Continued)

OTHER PUBLICATIONS

Search report in related application NL 2025974 dated May 14, 2021.

(Continued)

*Primary Examiner* — Ljiljana V. Ciric
(74) *Attorney, Agent, or Firm* — Patterson + Sheridan, LLP

(57) ABSTRACT

A thermal conditioning system and a cabin. The thermal conditioning system has a fan, a first heat exchanger, an outside air duct, a cabin air duct, a sensor, and a control unit. The thermal conditioning system is operated in a first mode and a second mode. In the first mode, the fan rotates in a first direction to direct the flow of air along a first flow path. In the second mode, the fan rotates in a second direction opposite to the first direction to direct the flow of air along a second flow path. The sensor provides a signal representative of a temperature of a part of the vehicle. The control unit switches the thermal conditioning system between the first mode and the second mode based on the signal.

14 Claims, 2 Drawing Sheets

Figure 1:
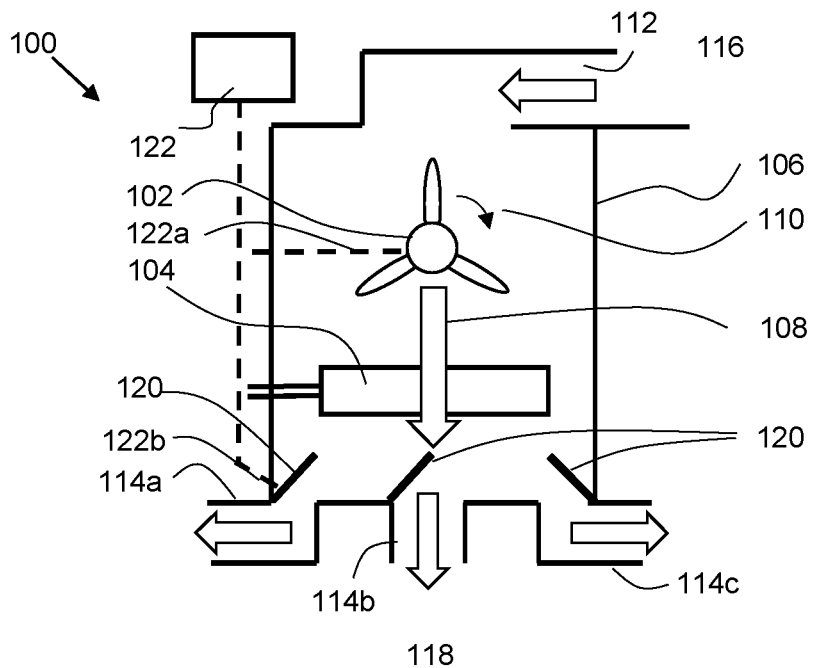

(52) U.S. Cl.
CPC ............. *B60H 1/248* (2013.01); *B60H 1/265* (2013.01); *B60H 2001/00178* (2013.01); *B60H 2001/003* (2013.01); *B60H 2001/00307* (2013.01)

(58) Field of Classification Search
CPC .... B60H 2001/00178; B60H 2001/003; B60H 2001/00307
See application file for complete search history.

(56) References Cited

U.S. PATENT DOCUMENTS

| | | | | |
|---|---|---|---|---|
| 5,483,805 | A * | 1/1996 | Fujii | B60H 1/00878 62/158 |
| 6,186,886 | B1 * | 2/2001 | Farrington | B60H 1/248 454/75 |
| 6,966,498 | B2 * | 11/2005 | Huang | B60H 1/0075 236/91 C |
| 9,016,080 | B2 * | 4/2015 | Brodie | F28D 20/028 62/239 |
| 9,428,035 | B2 * | 8/2016 | Eisenhour | B60H 1/00828 |
| 9,744,829 | B2 * | 8/2017 | Wang | B60H 1/248 |
| 9,914,336 | B2 * | 3/2018 | Smith | B60L 50/66 |
| 10,286,807 | B2 * | 5/2019 | Christen | H01M 10/63 |
| 10,514,191 | B2 * | 12/2019 | Liu | B60H 1/004 |
| 10,639,961 | B2 * | 5/2020 | Wijaya | B60H 1/00849 |
| 10,661,629 | B2 * | 5/2020 | Craig | B60H 1/00378 |
| 10,889,162 | B2 * | 1/2021 | Cosgrove | B60K 11/06 |
| 10,906,377 | B2 * | 2/2021 | Zenner | B60H 1/00328 |
| 10,913,332 | B2 * | 2/2021 | Sato | F01P 7/04 |
| 10,967,702 | B2 * | 4/2021 | Mancini | B60H 1/00564 |
| 11,338,642 | B2 * | 5/2022 | Suzuki | B60H 1/3228 |
| 11,358,433 | B2 * | 6/2022 | Androulakis | B60N 2/5621 |
| 11,433,733 | B2 * | 9/2022 | Reed | B60H 1/00807 |
| 11,628,704 | B2 * | 4/2023 | Bray | B60H 1/00885 454/69 |
| 11,807,067 | B2 * | 11/2023 | Mancini | B60H 1/22 |
| 12,168,388 | B2 * | 12/2024 | Shimauchi | B60H 1/00428 |
| 2003/0121988 | A1 * | 7/2003 | Rutyna | B60H 1/248 236/49.3 |
| 2008/0202139 | A1 * | 8/2008 | Darroman | B60H 1/00742 62/244 |
| 2009/0071178 | A1 * | 3/2009 | Major | B60L 58/27 62/239 |
| 2011/0036117 | A1 | 2/2011 | Frohling et al. | |
| 2011/0165829 | A1 * | 7/2011 | Nefcy | B60L 50/16 454/75 |
| 2013/0074525 | A1 * | 3/2013 | Johnston | B60H 1/323 62/126 |
| 2013/0317728 | A1 * | 11/2013 | Hall | B60H 1/00828 701/113 |
| 2014/0224448 | A1 | 8/2014 | Uppuluri | |
| 2015/0273975 | A1 * | 10/2015 | Kim | B60H 1/248 454/139 |
| 2016/0209099 | A1 * | 7/2016 | Liu | F25B 49/025 |
| 2017/0320374 | A1 * | 11/2017 | Ragazzi | B60H 1/00907 |
| 2017/0368916 | A1 * | 12/2017 | Ghannam | B60H 1/00828 |
| 2018/0304739 | A1 * | 10/2018 | Eberspach | B60H 1/00278 |
| 2018/0339261 | A1 * | 11/2018 | Meirav | B01D 53/0454 |
| 2019/0070924 | A1 * | 3/2019 | Mancini | B60H 1/32281 |
| 2020/0254848 | A1 * | 8/2020 | Semel | F25D 21/006 |
| 2020/0313256 | A1 * | 10/2020 | Kuronuma | H01M 10/66 |
| 2021/0331554 | A1 * | 10/2021 | Mancini | B60H 1/00278 |
| 2022/0118951 | A1 * | 4/2022 | Gutowski | B60J 1/2016 |
| 2022/0324288 | A1 * | 10/2022 | Cohan | B60L 58/26 |
| 2024/0140163 | A1 * | 5/2024 | Mancini | B60H 1/32281 |
| 2024/0294053 | A1 * | 9/2024 | Tanabe | B60H 1/00899 |

FOREIGN PATENT DOCUMENTS

| | | | |
|---|---|---|---|
| CN | 110194044 A | 9/2019 | |
| EP | 3000636 A1 * | 3/2016 | ........ B60H 1/00028 |
| FR | 2931731 A1 | 12/2009 | |
| GB | 2446922 A * | 8/2008 | ........ B60H 1/00735 |
| JP | 2004352085 A | 12/2004 | |
| JP | 2008092696 A * | 4/2008 | ........ B60H 1/00257 |
| JP | 6184481 B2 * | 8/2017 | ........ B60H 1/00778 |
| WO | WO-2008041762 A1 * | 4/2008 | ............. B60L 53/24 |

OTHER PUBLICATIONS

International Search Report and Written Opinion in related application PCT/EP2021/067727 dated Oct. 5, 2021.
Chinese Office Action dated May 22, 2025, for Chinese Patent Application No. 202180046968.6.

* cited by examiner

THERMAL CONDITIONING SYSTEM FOR A VEHICLE

The invention relates to a vehicle comprising a thermal conditioning system. In particular, the invention relates to a vehicle having an electric motor to drive the vehicle and having a battery to provide electrical energy to the electric motor, such as an electric car.

The project leading to this application has received funding from the European Union's Horizon 2020 research and innovation program under grant agreement No. 848620.

Vehicles, such as cars and busses, are made to convert energy into motion of the vehicle. A large part of the cars that are currently in use have a combustion engine that combusts fossil fuel to drive the car. By combusting the fossil fuel, chemical energy is converted into motion of the car.

Recent years, electric cars have become more popular. An electric car uses electrical energy to drive the motor to bring the electric car into motion. The electrical energy is typically stored in a battery. Electric cars have a great environmental benefit, because they do not emit carbon dioxide when they are used. Also, electric cars do not have the exhaust fumes as cars with combustions engines have, which reduces air pollution. Also, electric cars are much more efficient in converting electrical energy into motion than cars with combustion engines are in converting chemical energy into motion. When converting electrical energy into motion, not all electrical energy is converted into motion, but a small part of the electrical energy is converted into heat. Due to its high efficiency, an electric car typically generates less heat than a comparable car with a combustion engine.

The heat that is generated by the car is often used for heating the cabin of the car. The cabin is the part of the car in which the driver and the passengers take place. To provide the heat to the cabin, the car is provided with a unit for heat, ventilation, and air conditioning (HVAC). Such a unit is known as a HVAC-unit. The HVAC-unit may be able to provide heating of the cabin, to provide fresh air from an environment outside the car and to provide cooling of the cabin via an air conditioning system. The HVAC-unit may have a heat exchanger that transfers heat from the car to a flow of air. Typically, the heat from the car is generated by the car's motor. The flow of air is directed into the cabin.

Even though electric cars generate less heat than cars with combustion engines, electric cars need to have means to transfer heat from the electrical components of the car to the environment. Such electrical components are for example the motor, the battery and electronic parts. Without such means, the temperature of such electrical components may become too high during use of the car, forcing the driver to stop the car or causing damage to the components. To transfer heat from the electrical components to the environment outside the car, the car is typically provided with a radiator connected to a cooling circuit. The cooling circuit provides a flow of water to transfer heat from the electrical component to the radiator. The radiator transfers the heat to the outside air that is in contact with the radiator. The radiator is typically placed in the grill of the car, i.e., at the front side of the car, to come into contact with as much air as possible while driving the car. The surface area of the radiator needs to be large enough to transfer enough heat, even while driving at low speed.

Even though the radiator is needed for thermal control of the car, the shape of the radiator disturbs the aerodynamics of the car. A large amount of air needs to be pushed against the radiator in order for the radiator to transfer heat to the air outside the car. As a result, the radiator causes drag. The car needs more energy to achieve a certain speed due to this drag. Making the radiator smaller or more aerodynamic, helps to reduce the drag, but reduces the amount of heat the radiator can transfer to the outside air. The size of the radiator needs to take in account some situations that only occasionally occur. For example, the radiator needs to be large enough to transfer enough heat when driving up a steep hill or pulling a trailer on a hot day. Despite the maximum capacity of the radiator is used only occasionally, the radiator disturbs the aerodynamic shape of the car all the time.

US patent application US2014/0224448A1 provides a solution to transfer more heat from the engine, without increasing the size of the radiator. In this solution, there is a heat core provided in a HVAC-unit. The heat core provides heat to the cabin. This heat is transferred away from the engine and via a cooling circuit transferred to the heater core. By transferring heat away from the engine, the heater core helps to cool the engine. However, sometimes the passengers do not require heat from the heater core to heat up the cabin, while additional heat needs to be transferred from the engine. The known HVAC-unit solves this problem by using a system in which outside air flows via a blower into a HVAC-unit. A blend door sends the air either directly to the cabin or to the heater core. If the blend door sends the air to the heater core, the air is heated by the heater core, which takes away heat from the engine via a cooling circuit. A cooling blend sends the heated air either to the cabin if heating of the cabin is desired, or sends the heated air directly to outside the car via a duct. The duct exists for example at the bottom of the vehicle.

A problem of the HVAC-unit as disclosed by US2014/0224448A1 is that a system of ducts and valves or blends are needed to direct the flow of air either to the cabin or to the outside of the car. The system of ducts and valves adds weight to the car. The space used by the system of ducts and valves cannot be used by other car components. Also, each valve needs to be actuated, either manually or with an actuator, which adds complexity to the car.

A goal of the invention is to provide a thermal conditioning system that is less complex than the known HVAC-unit or at least to provide an alternative thermal conditioning system.

The goal of the invention is achieved by providing a vehicle comprising a thermal conditioning system and a cabin. The thermal conditioning system comprises a fan, a first heat exchanger, an outside air duct, a cabin air duct, a sensor, and a control unit. The fan is configured to generate a flow of air. The first heat exchanger is arranged to transfer heat to the flow of air. The thermal conditioning system is configured to be operated in a first mode and a second mode. In the first mode, the fan rotates in a first direction to direct the flow of air along a first flow path. In the second mode, the fan rotates in a second direction opposite to the first direction to direct the flow of air along a second flow path. The first flow path extends from an environment outside the vehicle through the outside air duct to the first heat exchanger and subsequently from the first heat exchanger through the cabin air duct into the cabin. The second flow path extends from the first heat exchanger via the outside air duct to the environment outside the vehicle. The sensor is arranged to provide a signal representative of a temperature of a part of the vehicle. The control unit is configured to switch the thermal conditioning system between the first mode and the second mode based on the signal. The thermal conditioning system is adapted to transfer more heat from the first heat exchanger to the flow of air in the second mode than in the first mode.

In the first mode, the fan directs a flow of air that is heated by the first heat exchanger to the cabin via the cabin air duct. This way, the cabin is heated with the flow of air. In some situations, the first heat exchanger may need to transfer heat to the flow of air to cool a part of the car, while no heating of the cabin is required. In another situation, some heat is desired in the cabin, but the first heat exchanger needs to transfer more heat to keep a temperature of a part of the vehicle below a certain value. In those situations, the control unit switches the thermal conditioning system to the second mode. In the second mode, the rotation of the fan is reversed compared to the first mode. By reversing the rotation of the fan, the fan sucks air from the cabin via the cabin air duct instead of directing the flow of air into the cabin. The air sucked from the cabin flows via the cabin air duct to the first heat exchanger. The flow of air is heated by the first heat exchanger, which allows the first heat exchanger to transfer heat away from the first heat exchanger. The fan directs the flow of air further towards the outside air duct, where the heated flow of air leaves the vehicle. In the second mode, the first heat exchanger transfers heat from the car to the environment outside the car, without transferring heat to the cabin. The thermal conditioning system is adapted to transfer more heat from the first heat exchanger to the flow of air in the second mode than in the first mode. In the first mode, the temperature of the flow of air is limited to provide comfort in the cabin. Also, a temperature of the flow of air that is too high may be dangerous. However, in the second mode, the flow of air is directed from the first heat exchanger to the environment outside the vehicle. This allows the temperature of the flow of air to be higher than in the first mode, for example as high as 50° C. or 60° C. or 70° C. This way, the first heat exchanger is able to transfer more heat to the flow of air in the second mode. By transferring the additional heat, the temperature of the part of the vehicle remains at an acceptable value.

The vehicle is for example a land vehicle such as a car or a bus or a truck. The land vehicle is for example configured to drive through rough terrain and is for example provided with a 4-wheel or all-wheel drive. In another example, the vehicle is a water vehicle such as a boat.

The cabin of the vehicle is the part of the vehicle where the driver of the vehicle or any passengers are when using the vehicle. The cabin comprises for example seats to seat the driver and/or a passenger. The cabin includes, for example, a cargo space for storing cargo on the vehicle. The cabin is for example divided into multiple compartments, wherein the flow of air is directed to one or more than one or all compartments in the first mode. The cabin is for example substantially closed, such as in a car with a fixed rooftop, or the cabin is substantially open, such as in a convertible with the rooftop off. Even in a convertible with the rooftop off, the people in the convertible are more comfortable when the thermal conditioning system is in the second mode when no heating of the cabin is desired.

The fan is a device that has a rotor that is able to create the flow of air. The rotor is for example provided with blades. The blades have a blade pitch which is the angle with which the blades are orientated on the rotor. The blade pitch is for example set to create the same amount of air flow for a certain rotational speed of the rotor in the first mode and the second mode. The blade pitch is for example 45°. Alternatively, the blade pitch is set to create an air flow with a larger air speed in the second mode for a certain rotational speed of the rotor than in the first mode. In another example, the fan is a centrifugal pump for pumping the flow of air. The centrifugal pump has for example two rotors, which are also referred to as impellers. One of the two rotors is configured to rotate in the first mode to direct the flow of air along the first flow path, whereas the other of the two rotors is configured to rotate in the second mode to direct the flow of air along the second flow path. In this example, the two rotors rotate sequentially, not simultaneously. Alternatively, the centrifugal pump has a single rotor. In yet another example, the fan is an axial pump for pumping the flow of air. In an example, the fan is a cross-flow fan, which is sometimes referred to as a tangential fan or a tubular fan. The flow of air moves transversely across the rotor of the cross-flow fan.

The fan comprises a motor that is configured to rotate the rotor of the fan relative to a stationary part of the fan. The stationary part of the fan is referred to as stator. For example, the motor has magnets on the rotor and electric coils on the stator. By providing an electric current to the coils, an electromagnetic force is generated between the electric coils on the stator and the magnets on the rotor causing the rotor to rotate relative to the stator. By controlling the timing and amount of electric current through the electric coils, the rotor is controlled to rotate in the first direction or in the second direction. For example, the first direction is clock-wise, and the second direction is counter clock-wise. In an embodiment the fan is provided with two rotors, for example two rotors arranged concentrically on the stator. One of the two rotors is configured to rotate in the first direction to generate the flow of air along the first flow path. The other of the two rotors is configured to rotate in the second direction to generate the flow of air along the second flow path. When one of the two rotors is rotating, the other of the two rotors is stationary, i.e., not rotating.

The first heat exchanger transfers heat with the flow of air by having a surface that contacts the flow of air. The larger the surface, the more easily heat can be transferred from the first heat exchanger to the flow of air. To create a large surface, the first heat exchanger has, for example, a surface comprising protrusions such as pins, and/or comprising dimples and/or grooves. The surface has, in an example, protruding features that cause the flow of air to be turbulent. Heat is more easily transferred to a turbulent flow of air than to a laminar flow of air. The first heat exchanger comprises, for example, a material with good heat transferring properties, such as aluminum. In an example, the first heat exchanger is entirely made from aluminum. By using a material with good heat transferring properties, heat is easily transferred within the first heat exchanger to the surface that contacts the flow of air.

In an example, the first heat exchanger comprises two heat exchangers. The flow of air passes the two heat exchangers subsequently. In this example, in the first mode, one of the two heat exchanger is configured as an evaporator to transfer heat from the flow of air. So in the first mode, one of the two heat exchangers cools the flow of air that is directed along the first flow path towards the cabin. This way, the cabin is provided with cooled air. In the second mode, both of the two heat exchangers are configured as condensers to transfer heat to the flow of air. So in the second mode, both the two heat exchangers heat the flow of air that is directed along the second flow path. By using two heat exchangers in the second mode, whereas using only one heat exchanger in the first mode, the thermal conditioning system is able to transfer more heat from the first heat exchanger to the flow of air in the second mode than in the first mode.

The cabin air duct is for example a single duct between the first heat exchanger and the cabin. In another example, the cabin air duct comprises multiple ducts between the first heat exchanger and the cabin. The driver can select through which of these ducts, or a combination of ducts, the flow of air flows, by setting one or more valves. One of the ducts directs, for example, the flow of air towards the front window of the vehicle. This way, the flow of air can be used to remove ice or fog from the front window. By providing a heated flow of air, ice on the front window will melt, and fog on the front window will disappear. Another one of the ducts directs, for example, the flow of air to the feet of the driver or of a passenger. It is very comfortable for people that are cold to get warm feet. Other ducts are for example provided to direct the flow of air towards side windows of the vehicle, to the back seat of the vehicle and/or to the cargo space such as the trunk of a car.

The outside air duct provides a duct between an outside environment of the vehicle and the first heat exchanger. The outside air duct comprises a single duct or multiple ducts. The side of the outside air duct that takes in outside air, is for example arranged near the bottom of the front window, in the grill at the front of the vehicle, and/or on the hood of the vehicle. In another example, the side of the outside air duct that takes in outside air is arranged on the roof of the vehicle or at the back of the vehicle. In yet another example, the side of the outside air duct that takes in outside air is arranged inside a motor compartment of the vehicle. In this example, the motor compartment has sufficient openings to allow air from outside the car to reach the outside air duct via the motor compartment. An advantage of having the outside air duct in the motor compartment is that the outside air duct is not likely clogged by snow or ice.

The sensor is for example a temperature sensor that provides information about the temperature of the vehicle's brakes, cabin, motor, battery or the temperature of a heat transfer medium in a cooling circuit. The sensor comprises for example a sensor that provides information about the workload of the motor, for example detecting the motor's revolutions per minute (rpm), the amount of electric current provided to the motor or the torque provided by the motor. The sensor comprises for example a sensor that provides information about brake usage, for example by detecting how much and how long the brake is used. The sensor comprises for example a sensor that provides information about a velocity of the vehicle and/or a wind velocity relative to the vehicle. The sensor comprises for example a sensor that provides information about a temperature of the environment outside the car and/or a temperature of an outer surface of the vehicle, such as the roof of the vehicle or a solar panel of the vehicle. In an embodiment, the sensor is part of a sensor system comprising multiple sensors that provide multiple parts of information.

Based on the information detected by the sensor, the sensor generates a signal. The control unit receives the signal and controls the thermal conditioning system based on the signal. Based on the signal, the control unit sets the thermal condition system in the first mode or in the second mode. Based on the signal of the sensor, the control unit drives the fan in the first direction or in the second direction. For example, when the sensor indicates a low motor temperature, the control unit sets the thermal condition system in the first mode. When the sensor indicates a high motor temperature, the control unit sets the thermal condition system in the second mode. For example, when the signal from the sensor exceeds a threshold, the control unit switches the thermal conditioning system from the first mode to the second mode. The threshold depends, for example, on the type of electric motor or electronic inverter or battery that is provided.

United States patent application US2016082809A1 provides a solution for the cabin becoming too hot after parking a car in the sun for some time. A system of valves is arranged in the HVAC-unit to provide air along a flow path. The flow path directs hot air from the cabin via the HVAC-unit to the outside of the car. The invention has the advantage over the solution of US2016082809A1 that the invention removes heat from the vehicle without the cabin being at a high temperature.

In an embodiment, the vehicle comprises a heat generating component. The sensor is arranged to provide the signal representative of the temperature of the heat generating component.

According to the embodiment, the vehicle has a heat generating component such as a motor or a gearbox or a brake or any other component that generates heat during use of the vehicle. Preferably, the heat generating component has a function different from generating heat, but heat is generated as a side effect from performing the function. For example, a brake has the function of slowing down the vehicle. While slowing down the vehicle, the brake heats up, so heat is generated as a side effect of slowing down the vehicle. Another example is that the function of the motor is to drive the vehicle. While driving the vehicle, the motor heats up, so heat is generated as a side effect of driving the vehicle. Another example of a heat generating component is a solar panel. The vehicle is for example provided with a solar panel on the roof of the vehicle to provide electrical energy to the vehicle. The function of the solar panel is to generate electricity by collecting sunlight. A side effect of this function is that the solar panel heats up. The heating up occurs because not all sunlight is converted into electricity. Some of the sunlight is reflected by the solar panel, while some of the sunlight is absorbed by the solar panel. The absorbed sunlight converts into heat. In addition, the electric currents in the solar panel cause the solar panel to heat up. The higher the temperature of the solar panel, the less efficient the solar panel is. An increase of the temperature of the solar panel by 20° C. can cause a reduction of efficiency by 8%. The heat generated by the heat generating components negatively affect the main function of the heat generating component when the temperature increases above a certain threshold.

In an embodiment, the second flow path extends from the cabin via the cabin air duct to the first heat exchanger, and subsequently from the first heat exchanger through the outside air duct to the environment outside the vehicle.

In this embodiment, the second flow path is subsequently from the cabin to the cabin air duct, from the cabin air duct to the first heat exchanger, from the first heat exchanger to the outside air duct, and from the outside air duct to the environment outside the vehicle.

An advantage of this embodiment is that the second flow path is along the same parts of the vehicle as the first flow path. Because the second flow path is along the same parts of the vehicle as the first flow path, the thermal conditioning system only requires a minimum amount of components. Because the cabin air duct is used for both the first flow path and the second flow path, no additional duct is required for the second flow path upstream of the first heat exchanger. In an alternative embodiment, the second flow path has an additional duct upstream of the first heat exchanger. In the alternative embodiment, the second flow path is from the environment outside the vehicle via the additional duct to the first heat exchanger, and from the first heat exchanger via the outside air duct back to the environment outside the vehicle. In the alternative embodiment, the second flow path does not start in the cabin, but starts in the environment outside the vehicle.

In an embodiment, the fan is configured to provide the flow of air along the first heat exchanger with a higher maximum flow speed or a higher maximum flow rate in the second mode than in the first mode.

According to this embodiment, the fan is able to direct more air and/or air at a higher speed along the first heat exchanger in the second mode than in the first mode. This allows more heat to be transferred from the first heat exchanger to the flow of air in the second mode. The maximum flow speed and maximum flow rate are limited in the first mode to provide a comfortable flow of air in the cabin. A flow speed that is too high in the first mode may lead to an uncomfortable draft in the cabin. A flow rate that is too high in the first mode may lead to an uncomfortable high pressure in the cabin. In the second mode, however, the flow speed and the flow rate may be larger than in the first mode, because the flow of air is directed outside of the cabin and out of the vehicle.

In an embodiment, the thermal conditioning system comprises a first cooling circuit. The first cooling circuit is adapted to provide a flow of a heat transfer medium through the first cooling circuit. The first cooling circuit is configured to transfer heat from the heat generating component via the heat transfer medium to the first heat exchanger.

To prevent the heat generating component to become too hot, the first cooling circuit is provided. The first cooling circuit provides a flow of a heat transfer medium. The heat transfer medium is a medium that is able to flow through the first cooling circuit and is able to absorb heat from the heat generating component and to transfer the heat towards the first heat exchanger. The heat transfer medium comprises, for example, water or a refrigerant or any other suitable coolant. The heat transfer medium comprises, for example, an Inorganic-Additive-Technology coolant (IAT-coolant), an Organic-Acid-Technology coolant (OAT-coolant), a Hybrid-Organic-Acid-Technology coolant (HOAT-coolant), or an Ethylene Glycol solution in water or a Propylene Glycole solution in water. The heat transfer medium comprises, for example, a water-glycol mixture as a coolant. The heat transfer medium comprises, for example, r1234yf refrigerant. The heat transfer medium exists, for example, in the first cooling circuit in a liquid phase or in a gaseous phase. The heat transfer medium changes, for example, from a liquid phase to a gaseous phase and vice versa in the first cooling circuit. The first cooling circuit is for example configured to absorb heat from the heat generating component by changing the heat transfer medium from a liquid phase to a gaseous phase. The first cooling circuit is for example configured to transfer heat toward the first heat exchanger by changing the heat transfer medium from a gaseous phase to a liquid phase.

The first cooling circuit is referred to as a cooling circuit, because the first cooling circuit is provided to cool the heat generating component. The skilled person would therefore consider the first cooing circuit to be a cooling circuit. However, while cooling the heat generating component, the first cooling circuit causes the first heat exchanger to heat up, so the first cooling circuit can also be considered as a heating circuit, or more general, as a heat transfer circuit or as a thermal energy transfer circuit.

The heat from the heat generating component is transferred to the heat transfer medium by a thermal contact between the heat generating component and the heat transfer medium. For example, the heat generating component has a surface that heats up during use of the heat generating component. The first cooling circuit has for example a tube that is in contact with that surface. The heat transfer medium is able to absorb heat from that surface by flowing through the tube. In another example, the first cooling circuit has one or more channels extending through the heat generating component. The heat transfer medium flows through those one or more channels to absorb heat from the heat generating component.

In an embodiment, the first cooling circuit is adapted to provide the heat transfer medium at a higher temperature in the second mode than in the first mode.

According to this embodiment, the first cooling circuit increases the temperature of the heat transfer medium in the second mode compared to the first mode. By increasing the temperature of the heat transfer medium, the temperature of the first heat exchanger increases. As a result, the first heat exchanger is able to transfer more heat in the second mode to the flow of air. The first cooling circuit is adapted to provide the heat transfer medium at different temperatures, for example, by making use of a refrigerant or a heat pump, or by changing a flow rate or flow speed of the heat transfer medium. In an example, the first cooling circuit is adapted to provide the heat transfer medium at different temperatures by using a different number of channels through which the heat transfer medium flows in the first mode and the second mode.

In an embodiment, the thermal conditioning system comprises a second heat exchanger. The first cooling circuit is configured to transfer heat from the heat generating component via the heat transfer medium to the first heat exchanger and the second heat exchanger in parallel. The second heat exchanger is arranged to transfer heat from the heat transfer medium to the environment outside the vehicle.

According to this embodiment, heat is transferred from the heat generating component to the first heat exchanger and the second heat exchanger in parallel. In parallel means that one part of the heat from the heat generating component is transferred to the first heat exchanger and not to the second heat exchanger, whereas another part of the heat from the heat generating component is transferred to the second heat exchanger and not to the first heat exchanger. In an example, the first cooling circuit is configured to firstly transfer heat from the heat transfer medium toward the first heat exchanger. Further downstream of the first cooling circuit, the first cooling circuit is configured to transfer heat from the heat transfer medium to the second heat exchanger.

The second heat exchanger is for example configured to transfer heat from the heat generating component to the environment independently of whether the thermal conditioning system is in the first mode or the second mode. The second heat exchanger is for example a radiator arranged in the grill of the vehicle. The second heat exchanger is for example sufficiently large to sufficiently cool the heat generating component for a majority of situations. For example, the majority of situations include using the vehicle in moderate environmental temperatures, using the vehicle with a moderate load and/or driving the vehicle at a moderate speed. In the example that the vehicle is a passenger car, the moderate environmental temperature is for example 25° C. or less, the moderate load is 4 passengers or less, and the moderate speed is less than 100 kilometer per hour, without excessive acceleration and deceleration.

In an example, the second heat exchanger receives heat from a heat generating component, whereas the first heat exchanger receives heat from a different heat generating component. For example, the second heat exchanger receives heat from the motor, whereas the first heat exchanger receives heat from the battery.

In an embodiment, the thermal conditioning system comprises a second cooling circuit and a third heat exchanger. The second cooling circuit is configured to provide a flow of a second heat transfer medium through the second cooling circuit. The third heat exchanger is configured to transfer heat from the heat transfer medium to the second heat transfer medium. The second cooling circuit is configured to transfer heat from the second heat transfer medium to the first heat exchanger.

According to this embodiment, the second cooling circuit is configured to transfer heat from the first cooling circuit to the first heat exchanger. An advantage of this embodiment is that the second cooling circuit improves the heat transfer between the first cooling circuit and the first heat exchanger. The heat transfer is especially improved for electric vehicles during hot days. Electronic components, such as the motor, of electric vehicles typically heat up till about 40° C. or 50° C., which is much lower than for example a combustion engine, which heats up till 90° C. Heating up an electronic component over 50° C. could result in damage of the electronic component, whereas a combustion engine remains undamaged at 90° C. On a hot day of 30° C., there is only a small temperature difference of 10-20° C. between the environment and the electronic component. By adding the second cooling circuit, the transfer of heat is improved, even for electric vehicles on a hot day. For example, the second heat transfer medium is a refrigerant. The refrigerant is evaporated at the third heat exchanger, so the refrigerant is in a gaseous phase and at a low temperature, for example 5° C. or 10° C. The low temperature of the refrigerant helps to transfer heat from the first cooling circuit, which is for example at a temperature of 40° C. or 50° C. By condensing the refrigerant at the first heat exchanger, the refrigerant goes into a liquid phase at a high temperature. The high temperature is used to transfer heat from the first heat exchanger to the flow of air created by the fan.

The second cooling circuit is referred to as a cooling circuit, because the second cooling circuit is provided to improve cooling of the heat generating component. The skilled person would therefore consider the second cooing circuit to be a cooling circuit. However, while improving cooling the heat generating component, the second cooling circuit causes the first heat exchanger to heat up, so the second cooling circuit can also be considered as a heating circuit, or more general, as a heat transfer circuit or as a thermal energy transfer circuit.

In an embodiment, the first flow path is opposite to the second flow path.

According to this embodiment, the first flow path is the same as the second flow path, except that the direction of the flow of air is opposite. In the first mode, the direction of the flow of air is from the environment outside the vehicle to the first heat exchanger to the cabin, whereas in the second mode, the direction of the flow of air is opposite to the direction in the first mode, i.e., from the cabin to the first heat exchanger to the environment outside the vehicle. In this embodiment, the thermal conditioning system only requires a minimum of parts, because the same parts are used for both the first flow path and the second flow path.

The embodiment has another advantage in case the thermal conditioning system is provided with an air filter. In the first mode, the air filter is arranged to remove particles, such as dirt and pollen, from the air that is taken in via the outside air duct. The particles are removed from the flow of air before the flow of air reaches the cabin. The air filter is for example located in the outside air duct, in the cabin air duct or near the fan. During the first mode, the particles accumulate at the air filter. Due to the accumulation of particles in the air filter, it will become more difficult for the flow of air to pass through the air filter. In a worst case scenario, the air filter is completely clogged with particles, so no air passes through the air filter. Because of the accumulation of particles in the air filter, the air filter requires regular cleaning or replacing. By providing the second flow path that is opposite to the first flow path, particles that have accumulated on the air filter can be removed from the air filter. Whereas the first flow path causes particles to enter the air filter, the second flow path causes the particles to be pushed away from the air filter. So during the second mode, the air filter is being cleaned with the flow of air along the second flow path. The particles that are released from the air filter are pushed out of the thermal conditioning system via the outside air duct. This way, the air filter requires less manual cleaning and/or requires less replacement. To improve the cleaning of the air filter, the fan is, for example, configured to provide a flow of air along the second flow path with a higher flow speed or a higher flow rate than the flow speed or flow rate along the first flow path. The higher flow speed or higher flow rate generates more pressure on the air filter to detach particles from the air filter. By, for example, providing more power to the fan in the second mode, or by the design of the rotor, the fan is configured to provide the higher flow speed or higher flow rate along the second flow path. For example, the rotational speed of the fan is larger in the second mode than in the first mode.

The thermal conditioning system is for example configured to periodically switch from the first mode to the second mode to clean the air filter. The period is for example once every day or every week or every month. The thermal conditioning system is for example configured to do so when the vehicle is not used, for example when the vehicle is parked or when no people are in the vehicle. When the thermal conditioning system switches to the second mode to clean the air filter, it may be that no heat is transferred from the first heat exchanger to the flow of air, because no heat is generated by the vehicle.

In an embodiment the vehicle comprises a battery, an electronic inverter and an electric motor. The battery is configured to provide electrical energy to the electronic inverter. The electronic inverter is configured to invert the electrical energy and to provide inverted energy to the electric motor. The electric motor is configured to drive the vehicle. The heat generating component is at least one of the battery, the electronic inverter and the electric motor.

In this embodiment, the vehicle is an electric vehicle, such as an electric car. The battery stores electric energy. When driving the vehicle, the battery provides the electric energy to the electronic inverter. The battery provides the electric energy to the electronic inverter as a direct current (DC). The electronic inverter inverts the electric energy from the battery from the direct current (DC) to an alternating current (AC). The electric motor uses the alternating current (AC) form the electronic inverter to drive the vehicle. In general, an electric motor powered by alternating current is more efficient than an electric motor powered by direct current. Because batteries are able to provide only a direct current, the electronic inverter is provided to power an efficient electric motor with the battery.

While driving an electric vehicle, an electrical current flows through the motor, the electronic inverter and the battery. Depending on the situation, for example while driving uphill with a fully loaded vehicle, the electrical current is a large current. A large electrical current causes the components to generate a lot of heat, causing the temperature of these components to raise. Unfortunately, a high temperature of these components reduces the efficiency or could even result in damage to the components. By transferring the heat from the electric motor, the electronic inverter and/or the battery to the first heat exchanger, the temperature of these components remains at a desired low value.

In an embodiment, the vehicle comprises a battery to provide electrical energy to the vehicle. The sensor is configured to provide a first charging signal and a second charging signal. The first charging signal is indicative of the battery not being charged. The second charging signal is indicative of the battery being charged. The control unit is configured to switch to the first mode based on the first charging signal and to switch to the second mode based on the second charging signal.

Regular charging the battery of a vehicle with a charging unit may take several hours to completely charge the battery. When fast charging the battery with a charging unit, the battery can be charged in a short amount of time, for example within 30 minutes. When charging the battery of a vehicle with a charging unit, especially when fast charging, a large electrical current runs through the battery. The electrical current generates heat that increases the temperature of the battery. The electrical current could also raise the temperature of other components in the vehicle, such as the converter that converts the voltage of the charging unit to the voltage of the battery. If the temperature becomes too high, the charging of the battery should be slowed down or even temporarily stopped so the battery is able to cool down. In this embodiment, the sensor is configured to indicate whether the battery is being charged or not. When the battery is not being charged or when charging of the battery has been completed, there is no large electrical current running through the battery. As a result, no or only little heat is generated by the battery, so the control unit sets the thermal condition system to the first mode. When the battery is being charged, a large electrical current is running through the battery. As a result, a lot of heat is generated by the battery, so the control unit sets the thermal condition system to the second mode to transfer at least part of the heat from the battery to the first heat exchanger. When charging the battery at a charging unit, switching to the second mode would not likely reduce any comfort to the user of the vehicle. Typically, during charging the battery at a charging unit, for example at home or at a charging station, the user of the vehicle is not inside the cabin, but somewhere else, such as outside taking a walk, being at home or being at work.

In an embodiment, the control unit is configured to alternate between the first mode and the second mode, when the battery is being charged. In this embodiment, the control unit switches between the first mode and the second mode, while the battery is being charged, to transfer enough heat away from the battery via the first heat exchanger on the one hand, and on the other hand to ensure a comfortable temperature in the cabin. For example, the battery is sufficiently cooled by the first heat exchanger when the thermal conditioning system is in the second mode for five minutes and then switches to the first mode for five minutes to achieve a desired temperature of the cabin. After the five minutes in the first mode, the thermal conditioning system switches back to the second mode again for five minutes. The switching is repeated as long as the battery is being charged. Instead of five minutes, any other suitable time period can be used, such as three or ten or fifteen minutes. For example, the time period of the first mode is different from the time period of the second mode. In another example, during charging of the battery, the thermal conditioning system is in the first mode until a desired temperature of the cabin has been reached. Then the thermal conditioning system switches to the second mode and remains in the second mode until additional heat in the cabin is desired. When additional heat in the cabin is desired, the thermal conditioning system switches back to the first mode. The switching is repeated as long as the battery is being charged.

In an embodiment, the vehicle comprises an electrical connection and a solar panel. The electrical connection is configured to connect with a charging unit to charge the battery with electrical energy. The solar panel is configured to charge the battery with solar electrical energy. The control unit is configured to switch to the second mode when the battery is being charged via the electrical connection.

In this embodiment, the battery of the vehicle can be charged by a solar panel or by a charging unit via an electrical connection on the vehicle. The solar panel provides solar electrical energy to the battery as long as the solar panel is exposed to sun light or other types of suitable light. The solar electrical energy is provided to the battery with a relatively low amperage, so charging with solar electrical energy does not generate a lot of heat in the battery. Charging the battery with a charging unit can only be done when the vehicle is stationary. It is preferred to charge the battery with the charging unit as fast as possible, so a large amperage is used to quickly provide a lot of energy to the battery. As a result, a lot of heat is generated when charging the battery with a charging unit, especially when fast charging. The control unit is configured to switch to the second mode when charging the battery via the charging unit to transfer the large amount of generated heat, and is configured to switch to the first mode when charging the battery via the solar panel during which only little heat is generated.

In an embodiment, the vehicle comprises a passage between the cabin and the environment outside the vehicle. The second flow path extends from the environment outside the vehicle via the passage to the cabin, and subsequently from the cabin via the cabin air duct to the first heat exchanger.

In the second mode, the fan sucks air from the cabin via the cabin air duct to the first heat exchanger. To prevent that an under-pressure is created in the cabin, the vehicle is provided with a passage. The passage forms a duct between the cabin and the environment outside the vehicle, so air can flow via the passage from the environment outside the vehicle into the cabin, when the thermal conditioning system is in the second mode. The passage is for example arranged in the roof of the vehicle, near the front window, near the back window, in one or more of the doors of the vehicle and/or in the bottom of the vehicle.

In an embodiment, the vehicle is configured to close the passage when the thermal conditioning system is in the first mode and to open the passage when the thermal conditioning system is in the second mode. To prevent undesired draft in the cabin, the passage is closed when the thermal conditioning system is in the first mode. In the second mode, the passage is opened to prevent an under-pressure in the cabin. The passage is for example a one-directional seal. The seal has for example a check valve or a flexible flap, such as a rubber flap. One side of the flap is in contact with air pressure in the cabin, whereas the other side of the flap is in contact with air pressure of the environment outside the vehicle. In the first mode, the air pressure in the cabin is equally large or somewhat larger than the air pressure outside the vehicle. The air pressure of the cabin pushes the flexible flap in a closed position, so the passage is closed. In the second mode, the fan sucks air from the cabin, causing a small decrease of air pressure in the cabin. The decrease of air pressure in the cabin is too small to cause discomfort to the people in the cabin. As a result, the air pressure in the cabin is smaller than the air pressure outside the vehicle. The air pressure outside the vehicle pushes the flexible flap in an opened position, so the passage is opened. In additional or alternatively, the passage is closed by a valve. The control unit, for example, controls an actuator that opens the valve in the second mode and closes the valve in the first mode.

In an embodiment, the vehicle comprises a window. The passage is formed by opening the window. The control unit is configured to open the window when the thermal conditioning system is in the second mode.

According to this embodiment, the vehicle is configured to open a window when in the second mode. For example, the control unit controls an actuator that opens a window in the second mode. The window is for example a side window at the driver's seat or a side window at a passenger's seat. The window is for example a rooftop window. The window is completely opened or partly opened. The window is for example partly opened to create a gap between the window and the window frame of 0.5 cm or 1 cm or 5 cm or 10 cm. The control unit is for example configured to close the window when the thermal conditioning system switches back to the first mode.

In an embodiment the invention relates to a vehicle comprising a thermal conditioning system and a cabin. The thermal conditioning system comprises a fan, a first heat exchanger, an outside air duct and a cabin air duct. The fan is configured to generate a flow of air. The first heat exchanger is arranged to transfer heat to the flow of air. The thermal conditioning system is configured to switch between a first mode and a second mode. In the first mode, the fan rotates in a first direction to direct the flow of air along a first flow path. In the second mode, the fan rotates in a second direction opposite to the first direction to direct the flow of air along a second flow path. The first flow path extends from an environment outside the vehicle through the outside air duct to the first heat exchanger and subsequently from the first heat exchanger through the cabin air duct into the cabin. The second flow path extends from the first heat exchanger via the outside air duct to the environment outside the vehicle. The first flow path is opposite to the second flow path. The vehicle comprises a heat generating component and a first cooling circuit. The first cooling circuit is adapted to provide a flow of a heat transfer medium through the first cooling circuit. The first cooling circuit is configured to transfer heat from the heat generating component via the heat transfer medium to the first heat exchanger. Optionally, the vehicle comprises a battery, an electronic inverter and an electric motor. The battery is configured to provide electrical energy to the electronic inverter. The electronic inverter is configured to invert the electrical energy and to provide inverted energy to the electric motor. The electric motor is configured to drive the vehicle. The heat generating component is at least one of the battery, the electronic inverter and the electric motor.

An advantage of the embodiment is that heat transfer from the heat generating component can temporarily be increased, for example when the heat generating component is in danger of becoming too hot. The invention is in particular useful when the heat generating component is a battery, an electronic inverter or an electric motor of a vehicle. These components may generate only little heat in one situation such as driving at a constant speed on flat terrain, and may generate a lot of heat in another situation, such as excessive accelerating and decelerating on hilly terrain.

In an embodiment there is provided a vehicle comprising a thermal conditioning system and a cabin. The thermal conditioning system comprises a fan, a first heat exchanger, an outside air duct and a cabin air duct. The fan is configured to generate a flow of air. The first heat exchanger is arranged to transfer heat to the flow of air. The thermal conditioning system is configured to switch between a first mode and a second mode. In the first mode, the fan rotates in a first direction to direct the flow of air along a first flow path. In the second mode, the fan rotates in a second direction opposite to the first direction to direct the flow of air along a second flow path. The first flow path extends from an environment outside the vehicle through the outside air duct to the first heat exchanger and subsequently from the first heat exchanger through the cabin air duct into the cabin. The second flow path extends from the first heat exchanger via the outside air duct to the environment outside the vehicle. The vehicle comprises a heat generating component and a first cooling circuit. The first cooling circuit is adapted to provide a flow of a heat transfer medium through the first cooling circuit. The first cooling circuit is configured to transfer heat from the heat generating component via the heat transfer medium to the first heat exchanger. The thermal conditioning system comprises a sensor and a control unit. The sensor provides a signal representative of information of a part of the vehicle. The control unit is configured to switch between the first mode and the second mode based on the signal. Optionally, the vehicle comprises a battery to provide electrical energy to the vehicle. The sensor is configured to provide a first charging signal and a second charging signal. The first charging signal is indicative of the battery not being charged. The second charging signal is indicative of the battery being charged. The control unit is configured to switch to the first mode based on the first charging signal and to switch to the second mode based on the second charging signal.

The embodiment has the advantage that based on the signal from the sensor, temporarily, additional heat transfer is provided from the heat generating component. This way, the heat generating component may remain at a desired temperature at which the heat generating component can efficiently perform its main function. The embodiment is particularly beneficial in case the heat generating component is the battery of the vehicle and the signal indicates whether the battery is being charged. During charging of the battery, the temperature of the battery may raise quickly. Unfortunately, a high temperature of the battery significantly reduces the effectiveness of the battery. By bringing the thermal conditioning system in the second mode to transfer heat from the battery during charging of the battery, the temperature of the battery does not exceed beyond a desired threshold temperature.

The invention will be described in more detail below under reference to the figures, in which in a non-limiting manner exemplary embodiments of the invention will be shown. The figures show:

FIG. 1, a detailed view of the thermal conditioning system in the first mode according to an embodiment of the invention.

Figure 2:
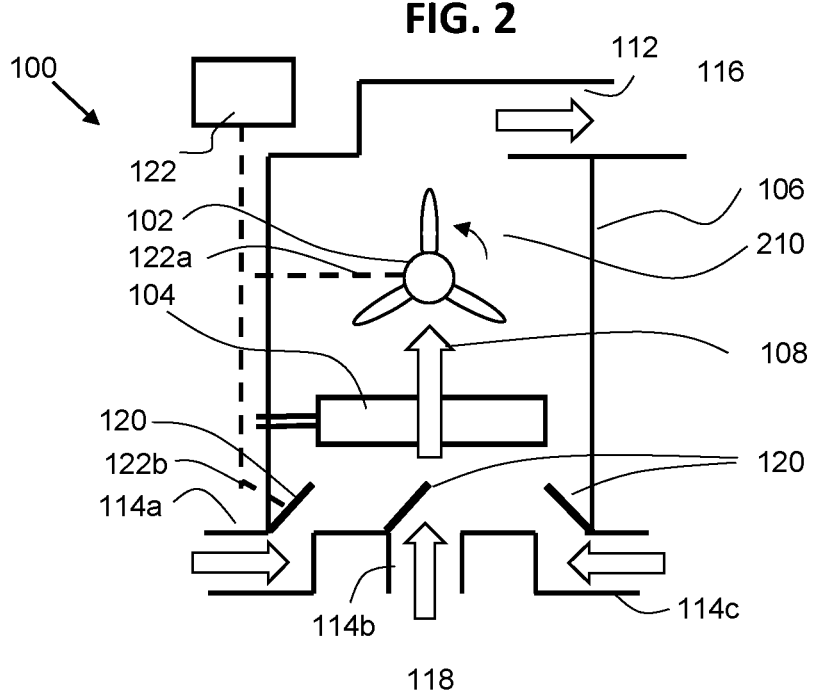

FIG. 2, a detailed view of the thermal conditioning system in the second mode according to an embodiment of the invention.

Figure 3:
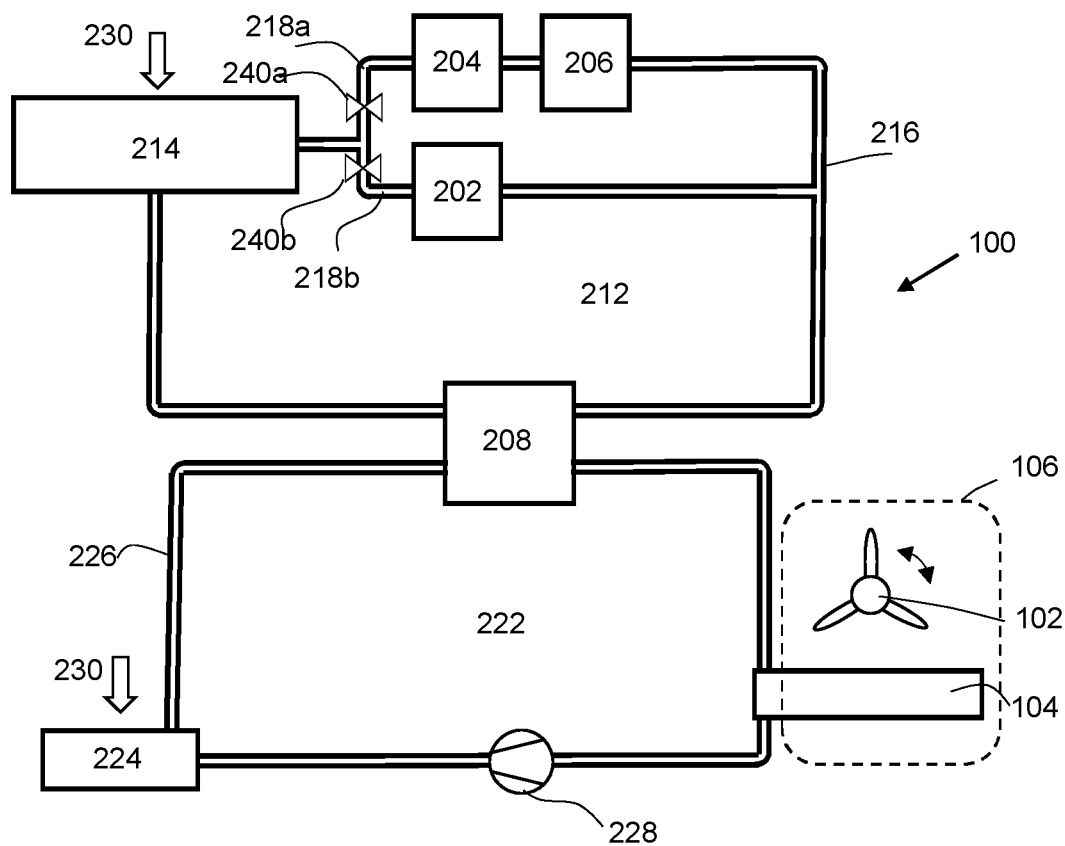

FIG. 3, the thermal conditioning system according to an embodiment of the invention.

Figure 4:
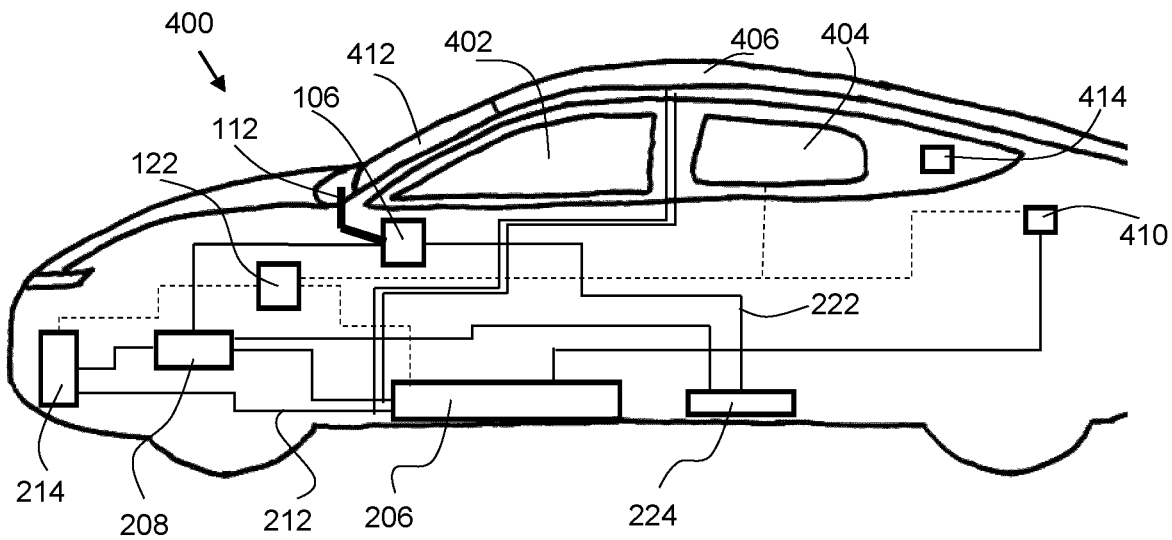

FIG. 4, a vehicle comprising the thermal conditioning system according to an embodiment of the invention.

FIG. 1 schematically discloses a detailed view of the thermal conditioning system 100 according to an embodiment of the invention. The thermal conditioning system 100 comprises a fan 102, a first heat exchanger 104, an outside air duct 112 and a cabin air duct 114. The fan 102 is configured to generate a flow of air 108. The first heat exchanger 104 is arranged to transfer heat to the flow of air 108. A HVAC-unit 106 is the part of the thermal conditioning system 100 that comprises the fan 102, the first heat exchanger 104, and the cabin air duct 114.

FIG. 1 discloses the thermal conditioning system 100 in the first mode. In the first mode, the fan 102 is rotated in the first direction 110 to direct the flow of air 108 along a first flow path. The first flow path is indicated by arrows. The first flow path extends from an environment 116 outside the vehicle through the outside air duct 112 to the first heat exchanger 104 and subsequently from the first heat exchanger 104 through the cabin air duct 114 into the cabin 118. The cabin air duct 114 comprises three ducts. Cabin air duct 114a is arranged to direct the flow of air 108 towards the front window of the vehicle. Cabin air duct 114b is arranged to direct the flow of air 108 towards the feet of the driver of the vehicle, when the driver is seated in the vehicle. Cabin air duct 114c is arranged to direct the flow of air 108 towards the upper body of the driver, when the driver is seated in the vehicle. Valves 120 are provided to the flow of air 108 over the three cabin air ducts 114a-114c. Each valve 120 is configured to be completely open, completely closed or partly open. In an example, one or more of the valves 120 is configured to not be closed completely, so the flow of air 108 is never completely blocked if all valves 120 are in a closed position. The driver or a passenger is able to manually or automatically set the valves 120 to receive the flow of air 108 via the desired cabin air ducts 114a-c.

The first heat exchanger 104 is provided with heat from a heat generating component. The first heat exchanger 104 transfers the heat to the flow of air 108 that passes the first heat exchanger 104.

The thermal conditioning system 100 comprises a control unit 122 which is configured to control the rotational speed and the rotational direction of the fan 102. The control unit 122 has an output terminal to send a control signal 122a to the fan 102. The fan 102 has an input terminal to receive the control signal 122a. A dashed line in FIG. 1 represents the connection between the control unit 122 and the fan 102 over which the control signal 122a is sent from the control unit 122 to the fan 102. The fan 102 has a motor, which is not shown in FIG. 1. Based on the control signal 122a, the motor is driven to rotate the rotor of the fan 102. In the first mode, the control unit 122 controls the fan 102 to rotate in the first direction 110. In the first mode, the motor is driven by the control signal 122a to rotate the rotor of the fan 102 in the first direction 110.

The control unit 122 further has an output terminal to send a control signal 122b to the valves 120. A dashed line in FIG. 1 represents the connection between the control unit 122 and the valves 120 over which the control signal 122b is sent from the control unit 122 to the valves 120. The valves 120 have at least one actuator, which is not shown in FIG. 1. The at least one actuator is configured to open and close the valves 120, based on the control signal 122b.

FIG. 2 discloses a detailed view of the thermal conditioning system 100 in the second mode according to an embodiment of the invention. In the second mode, the fan 102 rotates in a second direction 210 opposite to the first direction 110 to direct the flow of air 108 along a second flow path. The second flow path is indicated by arrows that are directed opposite to the arrows of the first flow path in FIG. 1. In FIG. 2 the second flow path extends from the cabin 118 via one or more of the cabin air ducts 114a-c to the first heat exchanger 104. The second flow path continues from the first heat exchanger 104 via the outside air duct 112 to the environment 116 outside the vehicle. The first heat exchanger 104 is provided with heat from a heat generating component. The first heat exchanger 104 transfers the heat to the flow of air 108 that passes the first heat exchanger 104. Because the flow of air 108 is directed via the outside air duct 112 to the environment 116 outside the vehicle, the heat from the first heat exchanger 104 is carried by the flow of air 108 away from the cabin 118 and out of the vehicle.

The control unit 122 controls the fan 102 to rotate in the second direction 210 by sending the control signal 122a from the output terminal of the control unit 122 to the input terminal of the fan 102. The motor of the fan 102 drives the rotor of the fan 102 in the second direction 210 based on the control signal 122a. The control unit 122, for example, sends the control signal 122b from the output terminal of the control unit 122 to the input terminal of the valves 120 to open the valves 120. By opening the valves 120, the control unit 122 ensures that enough air can be drawn in from the cabin 118 to transfer the heat to via the first heat exchanger 104.

FIG. 3 discloses the thermal conditioning system 100 according to an embodiment of the invention. The thermal conditioning system 100 comprises a first cooling circuit 212 and a second cooling circuit 222. The first cooling circuit 212 comprises a second heat exchanger 214, a conduit 216, a first branch 218a and a second branch 218b. The first cooling circuit 212 is configured to provide a flow of heat transfer medium through the conduit 216 and to bring the heat transfer medium into thermal contact with a motor 202, an inverter 204 and a battery 206 of the vehicle. For example, the conduit 216 passes through the motor 202, the inverter 204 and the battery 206. During use of the vehicle the motor 202, the inverter 204 and/or the battery 206 reach a temperature that is higher than the temperature of the heat transfer medium. Because the heat transfer medium is in thermal contact with the motor 202, the inverter 204 and the battery 206, these components transfer heat to the heat transfer medium. The first cooling circuit 212 is configured to provide the heat transfer medium to the second heat exchanger 214. The second heat exchanger 214 is in contact with outside air 230, and is, for example, arranged at the grill of the vehicle. The second heat exchanger 214 transfers the heat from the heat transfer medium to the outside air 230.

After the second heat exchanger 214, the conduit 216 is divided into a first branch 218a and a second branch 218b. The first branch 218a forms a conduit that passes through the inverter 204 and the battery 206. The second branch 218b forms a conduit that passes through the motor 202. This way, the first branch 218a can be optimized for cooling the inverter 204 and the battery 206, whereas the second branch 218b is optimized for cooling the motor 202. For example, valve 240a is arranged in the first branch 218a and valve 240b is arranged the second branch 218b to seta flow of the heat transfer medium through the first branch 218a and the second branch 218b respectively. The valves 240a, 240b are configured to restrict the flow of the heat transfer medium when only little heat needs to be transferred from the heat generating components, whereas the valves 240a, 240b are configured to increase the flow of the heat transfer medium when a lot of heat needs to be transferred from the heat generating components. The control unit 122 is configured to control the valves 240*a*, 240*b*. The control unit 122 is configured to send a control signal to the valves 240*a*, 240*b* to open or close one or more of the valves 240*a*, 240*b*.

The second cooling circuit 222 comprises a fourth heat exchanger 224, a conduit 226 and a compressor 228. The conduit 226 is configured to provide a flow of a second heat transfer medium through the first heat exchanger 104, the compressor 228 and the fourth heat exchanger 226.

The first cooling circuit 212 and the second cooling circuit 222 are connected to each other via a third heat exchanger 208. The third heat exchanger 208, which can be referred to as a chiller, receives heat from the first cooling circuit 212 and transfers this heat to the second cooling circuit 222. The second cooling circuit 222 transfers this heat further to the first heat exchanger 104 to operate the thermal conditioning system 100 in the first mode or the second more. The second cooling circuit 222 transfers a part of the heat from the first cooling circuit 212 to the fourth heat exchanger 224. The fourth heat exchanger 224 is in contact with outside air 230 and is, for example, arranged at the bottom side of the vehicle. The fourth heat exchanger 224 transfers heat from the second cooling circuit 222 to the outside air 230.

The compressor 228 is configured to compress the second heat transfer medium in the second cooling circuit 222. By compressing the second heat transfer medium before the fourth heat exchanger 224, the second heat transfer medium has a high temperature in the fourth heat exchanger 224. Because of the high temperature of the second heat transfer medium, heat is easily transferred from the fourth heat exchanger 224 to the outside air. The third heat exchanger 208 is configured to decompress or evaporate the second heat transfer medium in the second cooling circuit 222. By evaporating the second heat transfer medium in the third heat exchanger 208, the second heat transfer medium has a low temperature in the third heat exchanger 208. Because of the low temperature of the second heat transfer medium, heat is easily transferred from the first cooling circuit 212 via the third heat exchanger 208 to the second cooling circuit 222. Optionally, the second heat transfer medium is compressed before or at the first heat exchanger 104. By compressing the second heat transfer medium before or at the first heat exchanger 104, the temperature of the second heat transfer medium is increased at the first heat exchanger 104. With the increased temperature, the first heat exchanger 104 is able to transfer heat to the flow of air 108 more easily.

FIG. 4 schematically discloses a vehicle, i.e., a car 400, comprising the thermal conditioning system 100 according to an embodiment of the invention. The car 400 has a cabin 402 in which seats are provided to seat the driver and passengers. The car 400 is an electric car having a battery 206 for providing electrical energy to an electric motor (not shown in the figure). The car 400 has an electronic inverter, not shown in the figure, to invert the electrical energy from the battery 206 and to provide the inverted electrical energy to the motor. The car 400 further has a solar panel 406 on the roof of the car 400 to provide solar electrical energy to the battery 206. The car 400 has an electrical connector 410 that is electrically connected to the battery 206. The electrical connector 410 is for connecting the battery 206 with a charging unit to charge the battery 206. The charging unit uses electricity from the power net to charge the battery 206 of the car 400.

FIG. 4 shows schematically that the car 400 is provided with the HVAC-unit 106, the second heat exchanger 214, the third heat exchanger 208 and the fourth heat exchanger 224. The other parts of the thermal conditioning system 100 are also applied in this embodiment, but are not shown in FIG. 4. The outside air duct 112 has an opening near the lower edge of the front window 412. The second heat exchanger 214 is located behind the grill of the car 400, i.e. at the front of the car. The battery 206 is located at a bottom part of the car 400. The first cooling circuit 212 is connected to the battery 206 to transfer heat from the battery 206 to the second heat exchanger 214 and the third heat exchanger 208. The third heat exchanger 208 transfers at least some of the heat from the battery 206 to the HVAC-unit 106 via the second cooling circuit 222. The second cooling circuit 222 includes the fourth heat exchanger 224 that is arranged at a bottom part of the car 400.

The car 400 has a side window 404 that can be opened by lowering the side window 404. By lowering the side window 404, a gap is created between the upper edge of the glass of the side window 404 and the window frame. The control unit 122, not shown in FIG. 4 is arranged to lower the side window 404, when the thermal conditioning system 100 is in the second mode to create the passage between the cabin 402 and the environment outside the car 116. In addition, the car 400 is provided with a one-directional seal 414 to provide an additional passage when the thermal conditioning system 100 is in the second mode.

In an embodiment, the first cooling circuit 212 is connected to the solar panel 406 to transfer heat from the solar panel 406 to the first cooling circuit 212. A solar panel generally loses 8% of efficiency if the temperature of the solar panel increases with 20° C. By connecting the first cooling circuit 212 to the solar panel 406, heat is removed from the solar panel 406, which reduces the temperature of the solar panel 406 and thus increases the efficiency of the solar panel 406.

FIG. 4 shows the control unit 122. The control unit 122 is connected to several parts of the car 400, as indicated by the dashed lines. The control unit 122 is connected to a sensor arranged in the second heat exchanger 214. The sensor in the second heat exchanger 214 is a temperature sensor that generates a signal representative of the temperature of the heat transfer medium in the second heat exchanger 214. The control unit 122 is connected to a sensor arranged in the battery 206. The sensor in the battery 206 is a temperature sensor that generates a signal representative of the temperature of the battery 206. For example, the temperature sensor measures the temperature of the heat transfer medium in the battery 206. The control unit 122 is connected to a sensor in the electrical connector 410. The sensor in the electrical connector 410 generates a signal representative of whether the electrical connector 410 is connected to a charging unit or not. The sensor in the electrical connector 410 generates for example a signal representative of whether the battery 206 is being charged or not. The control unit 122 is connected to the side window 404. The control unit 122 is configured to provide a control signal to the side window 404 to control a motor of the side window 404. Based on the control signal, the motor of the side window 404 lowers or raises the side window 404. When the thermal conditioning system 100 is in the second mode, the control unit 122 sends the control signal to the motor of the side window 404 to lower the side window 404.

As required, this document describes detailed embodiments of the present invention.

Furthermore, the various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" are constitute open language and do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

The invention claimed is:

1. A vehicle comprising a thermal conditioning system and a cabin,
wherein the thermal conditioning system comprises a fan, a first heat exchanger, an outside air duct, a cabin air duct, a sensor, and a control unit,
wherein the fan is configured to generate a flow of air,
wherein the first heat exchanger is arranged to transfer heat to the flow of air,
wherein the thermal conditioning system is configured to be operated in a first mode and a second mode,
wherein, in the first mode, the fan rotates in a first direction to direct the flow of air along a first flow path,
wherein, in the second mode, the fan rotates in a second direction opposite to the first direction to direct the flow of air along a second flow path,
wherein the first flow path extends from an environment outside the vehicle through the outside air duct to the first heat exchanger and subsequently from the first heat exchanger through the cabin air duct into the cabin, and
wherein the second flow path extends from the first heat exchanger via the outside air duct to the environment outside the vehicle,
wherein the sensor is arranged to provide a signal representative of a temperature of a heat generating component,
wherein the control unit is configured to switch the thermal conditioning system between the first mode and the second mode based on the signal,
wherein the thermal conditioning system is adapted to transfer more heat from the first heat exchanger to the flow of air in the second mode than in the first mode,
the vehicle further comprising the heat generating component, wherein the sensor is arranged to provide the signal representative of the temperature of the heat generating component.

2. The vehicle according to claim 1, wherein the second flow path extends from the cabin via the cabin air duct to the first heat exchanger, and subsequently from the first heat exchanger through the outside air duct to the environment outside the vehicle.

3. The vehicle according to claim 1, wherein the fan is configured to provide the flow of air along the first heat exchanger with a higher maximum flow speed or a higher maximum flow rate in the second mode than in the first mode.

4. The vehicle according to claim 1, wherein the thermal conditioning system comprises a first cooling circuit, wherein the first cooling circuit is adapted to provide a flow of a heat transfer medium through the first cooling circuit, wherein the first cooling circuit is configured to transfer heat from the heat generating component via the heat transfer medium to the first heat exchanger.

5. The vehicle according to claim 4, wherein the first cooling circuit is adapted to provide the heat transfer medium at a higher temperature in the second mode than in the first mode.

6. The vehicle according to claim 4, wherein the thermal conditioning system comprises a second heat exchanger, wherein the first cooling circuit is configured to transfer heat from the heat generating component via the heat transfer medium to the first heat exchanger and the second heat exchanger in parallel, wherein the second heat exchanger is arranged to transfer heat from the heat transfer medium to the environment outside the vehicle.

7. The vehicle according to claim 6, wherein the thermal conditioning system comprises a second cooling circuit and a third heat exchanger, wherein the second cooling circuit is configured to provide a flow of a second heat transfer medium through the second cooling circuit, wherein the third heat exchanger is configured to transfer heat from the heat transfer medium to the second heat transfer medium, and wherein the second cooling circuit is configured to transfer heat from the second heat transfer medium to the first heat exchanger.

8. The vehicle according to claim 1, comprising a battery, an electronic inverter and an electric motor, wherein the battery is configured to provide electrical energy to the electronic inverter, wherein the electronic inverter is configured to invert the electrical energy and to provide inverted energy to the electric motor, wherein the electric motor is configured to drive the vehicle, and wherein the heat generating component is at least one of the battery, the electronic inverter and the electric motor.

9. The vehicle according to claim 1, comprising a battery to provide electrical energy to the vehicle, wherein the sensor is configured to provide a first charging signal and a second charging signal, wherein the first charging signal is indicative of the battery not being charged, wherein the second charging signal is indicative of the battery being charged, wherein the control unit is configured to switch the thermal conditioning system to the first mode based on the first charging signal, and to switch the thermal conditioning system to the second mode based on the second charging signal.

10. The vehicle according to claim 9, wherein the control unit is configured to alternate between the first mode and the second mode, while the battery is being charged.

11. The vehicle according to claim 9, comprising an electrical connection and a solar panel, wherein the electrical connection is configured to connect with a charging unit to charge the battery with electrical energy, wherein the solar panel is configured to charge the battery with solar electrical energy, and wherein the control unit is configured to switch to the second mode when the battery is being charged via the electrical connection.

12. The vehicle according to claim 1, comprising a passage between the cabin and the environment outside the vehicle, wherein the second flow path extends from the environment outside the vehicle via the passage to the cabin, and subsequently from the cabin via the cabin air duct to the first heat exchanger.

13. The vehicle according to claim 12, wherein the vehicle is configured to close the passage when the thermal conditioning system is in the first mode and to open the passage when the thermal conditioning system is in the second mode.

14. The vehicle according to claim 13, comprising a window, wherein the passage is formed by opening the window, wherein the control unit is configured to open the window when the thermal conditioning system is in the second mode.

* * * * *